July 27, 1937.　　　L. G. KASKEY　　　2,088,376
BEVERAGE DISPENSER
Filed Sept. 5, 1936　　　2 Sheets-Sheet 1
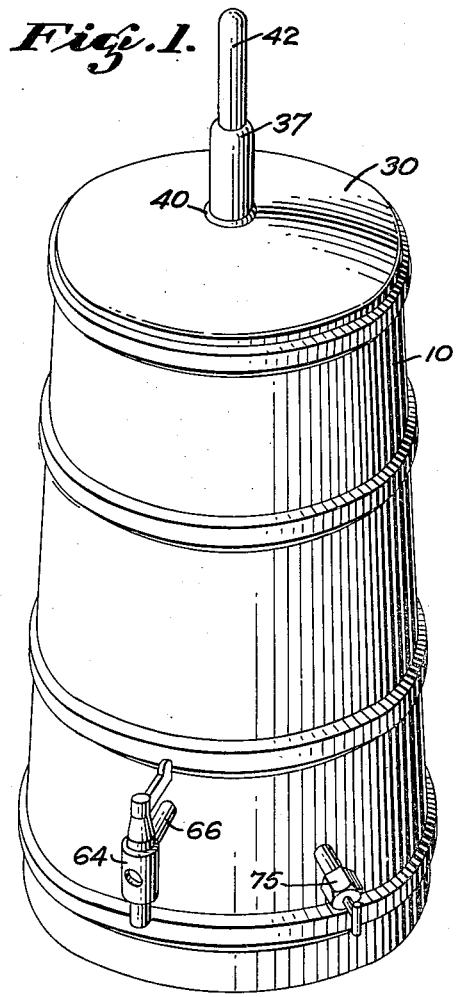
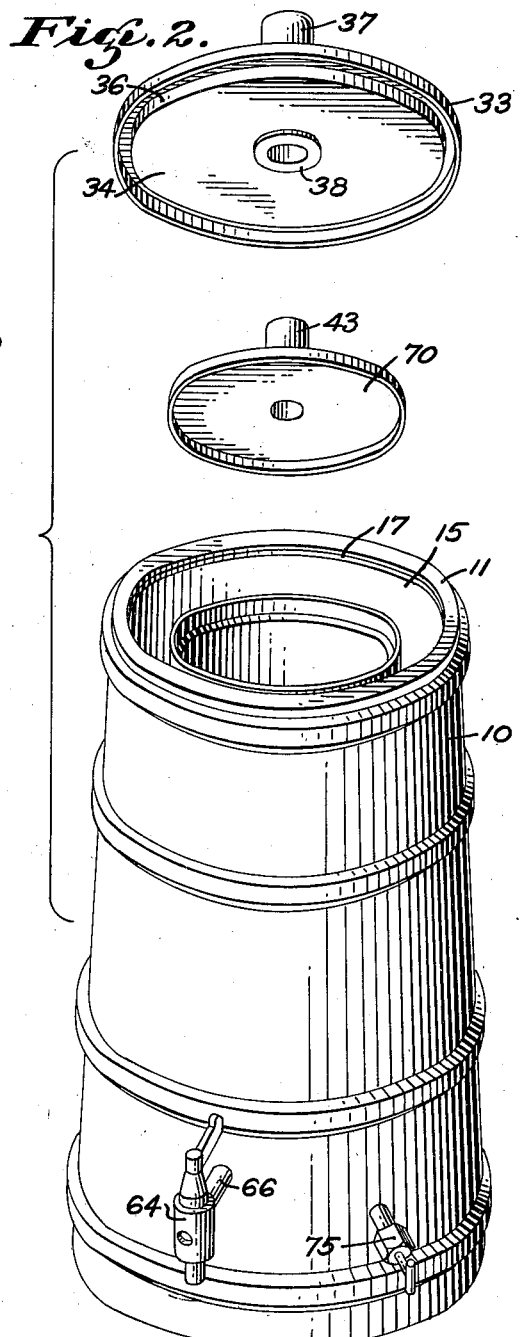
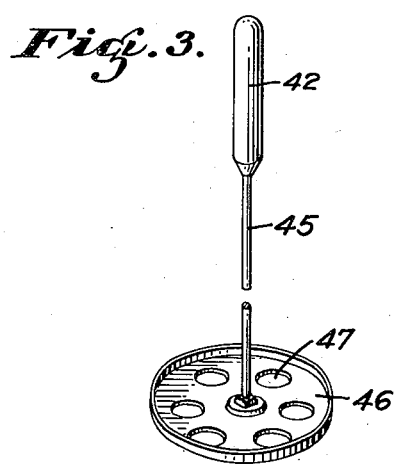
INVENTOR.
LOUIS G. KASKEY
BY
ATTORNEY.

July 27, 1937.    L. G. KASKEY    2,088,376
BEVERAGE DISPENSER
Filed Sept. 5, 1936    2 Sheets-Sheet 2

INVENTOR.
LOUIS G. KASKEY
BY
ATTORNEY.

Patented July 27, 1937

2,088,376

UNITED STATES PATENT OFFICE 2,088,376

BEVERAGE DISPENSER

Louis G. Kaskey, Oakland, Calif., assignor to Buttermilk Dispensers, San Francisco, Calif., a partnership composed of Calvin C. Chapman, limited partner, and Louis G. Kaskey and Charles E. Gibbs, general partners Application September 5, 1936, Serial No. 99,550

4 Claims. (Cl. 225—40)

My invention relates to improvements in refrigerating device.

One of the objects of my invention is to provide a cooling cabinet having novel features of construction and employing a minimum number of parts. Another object of my invention is to provide an insulated cabinet having novel means of assembling and holding the parts in assembled position. Another object of my invention is to provide a refrigerator wall having insulation of varied effectiveness whereby the cold produced in the lower region of the refrigerating chamber is better insulated than the zone near the top of said chamber. Another object of my invention is to provide a novel form of refrigerated dispensing means having provision for stirring the contents.

Other objects and advantages of my invention will appear from the following description, taken in connection with the drawings forming a part hereof, in which:

Fig. 1 is a perspective view showing my invention in assembled form;

Fig. 2 is a similar view showing the cover members in lifted position and the agitator removed;

Fig. 3 is a perspective view of the agitator unit;

Figure 5:
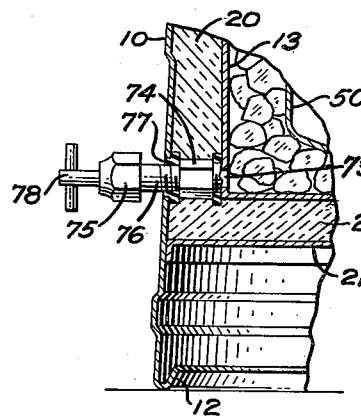
Fig. 5 is a cross-section detail of the refrigerant discharge faucet, not visible in Fig. 4.
Figure 4:
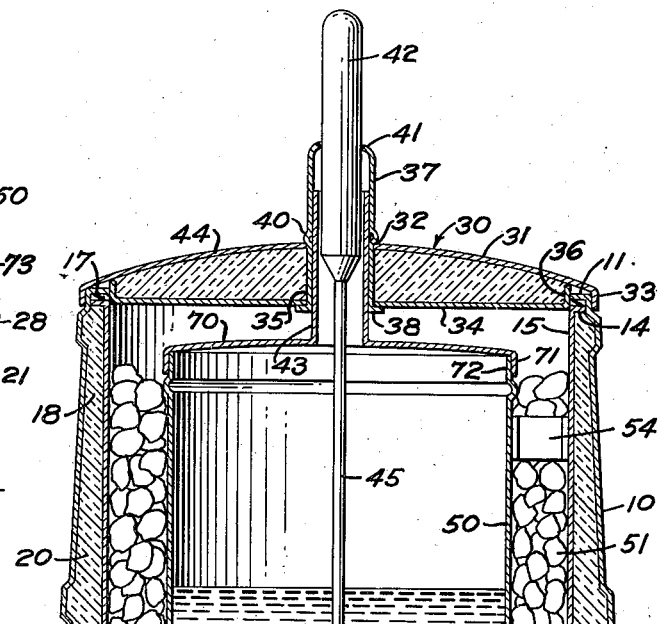
Fig. 4 is a cross-section elevational view of my invention.

The main body of the refrigerating device comprising my invention is composed of an outer shell 10, having an in-turned flange 11 at its top and an in- and up-turned flange 12 at its bottom; and an inner shell 13, having an out-turned flange 14 at its top, side walls 15, and bottom 16. A cork gasket 17 is fitted between the flanges 11 and 14 and serves to seal the interior space 18 which is filled with a suitable insulating material, 20.

The outer shell 10 is formed with an outward taper toward the bottom. The inner shell 13 is preferably cylindrical with substantially vertical walls. The effect of combining the inner and outer shells is therefore, to provide the space 18, narrower at its top than at its bottom. In this way it is possible to place more insulating material 20 near the bottom of the shell than near the top. It is desirable to have the insulating effect increase towards the lower portion of the container because the potential rate of heat transfer between the device, including its contents, and the atmosphere and exterior objects is greater toward the bottom of the device. Thus, by providing additional insulation near the bottom, it is more difficult for the cold to get out.

One of the novel features of my invention is the simple manner in which the above described parts are secured together, and which I effect by means of the bottom 21, having flange portion 22 and suitable indentations 23 to receive the ends 24 of spacing members 25. The latter have feet 26 which rest in flange 12, and threaded portions 27. By means of a wrench these spacing means can be adjusted to put whatever pressure is desired on the bottom 21 and below bottom 16 of the inner shell. The positioning of inner shell 15 within outer shell 10 and the securing of a tight joint around cork gasket 17 is accomplished by the pressure exerted on bottom 21 by spacing means 25, which is transmitted through insulation 28 on the bottom 16 of inner shell 13. This has the advantage of leaving the exterior of the outer shell 10 without any exposed fastening means, perforations, etc., and is a distinct advantage when assembling the devices.

The open top of the insulated container thus far described is closed by means of a cap 30. The latter is formed of a stamping 31, having a perforation 32 in its center and a down-turned flange 33 at its outer periphery; and a second stamping 34 having a perforation 35 in its center and an up-turned flange 36 adapted to fit against the cork gasket 17 as shown. These two parts are held in assembled relationship by means of a tubular member 37 having flange 38 fitting against member 34 and a swedged ring portion 40 bearing against top member 31 at perforation 32. The top of tubular member 37 is perforated at 41 to allow free passage of handle 42. Tubular member 37 is also of a sufficient diameter to receive the neck portion 43 of the beverage container.

Suitable insulation 44 is placed between top members 31 and 34 prior to their being secured together by the swedge 40.

Any suitable form of beverage container may be placed within the insulated case described. In the form shown in the attached drawings, the device is particularly adapted to dispensing liquids which require occasional stirring or agitation to keep the heavier particles distributed evenly throughout the mixture.

The beverage container 50 may be round or any other shape adapted for the purpose and should be of a dimension smaller than the inner member 15, sufficient to permit the ready insertion of a refrigerant 51, such as ice, between the two walls. Likewise, it should be mounted above the bottom 28 sufficiently to allow the refrigerant to find its way into the space formed thereby.

As illustrated, the container 50 is round and is supported on the bottom 28 of the inner shell 13 by means of a plurality of stilts 52 which may be bolted or otherwise secured as at 53 to bottom 28. Spacing means 54 near the upper portion of container 50 may be employed.

The bottom 55 of container 50 is formed with a tubular outlet 56 which may be suitably threaded and projected into nut 57 for one-half of the latter's thickness. A short threaded nipple 58 is threaded into the other half of nut 57, the former passing through perforation 60 in wall 15 and into nut 61 for half its depth. Nut 62 and suitable washers 63 provide a leak-tight joint around perforation 60. The dispensing faucet 64 is inserted through perforation 65 in outer case 10 and its inner threaded neck 66 is secured in the left half of nut 61. By filing off a portion of the end of neck 66, it is a simple matter to adjust faucet 64 so that it screws up tight in nut 61 in an upright position.

A rubber gasket 67 surrounds neck 66 and prevents the leakage or loss of insulation material 20. The reason for employing nipple 58 is that this construction simplifies the assembly and where it is desired to insert a new container 50, it is not then necessary to remove the faucet and nuts 61 and 62. The container can be detached from nut 57.

The container 50 is closed at its top by a top member 70 having a flange 71 to fit the container flange 72. A neck portion 43 is secured to top 70 and through the neck portion passes the handle 42, with attached rod 45, for actuating the agitating member 46. The latter is provided with suitable perforations 47 which aid in dispersing the mixture as the handle 42 is moved up and down prior to dispensing a drink.

The inner shell 13 is provided near its base (see Fig. 5) with a tubular outlet portion 73 on which is threaded for one-half of its thickness a nut 74. A suitable stop-cock 75, having threaded portion 76 is secured in the other half of nut 74 through a perforation 77 in outer shell 10. By removing the screw needle valve member 78, the liquefied contents of the refrigerant chamber may be drawn off.

From the foregoing description it will be seen that I have invented a refrigerating device which is simplicity itself, and with parts so designed and formed as to make their assembly a minimum task. The container 50 and inner shell 13 are assembled, then the cork gasket 17 is set on flange 14 of inner shell 13, and outer shell 10 is telescoped into position. The parts are inverted and insulation 20 and 28 inserted, then bottom plate 21 is secured in place and as members 27 are tightened, the insulation is compressed and inner shell 13 becomes rigidly supported.

I wish it understood that the foregoing description is intended to set forth one embodiment of my invention and that I do not intend thereby to be limited from the structures which are the equivalent thereof and which come within the terms of the following claims.

1. In a refrigerator device the combination of an outer shell, having an in-turned flanged edge at top and bottom, an inner shell having its top edge out-turned and of a diameter to fit the aforesaid top flange and having its bottom closed, a bottom member fitting substantially to the wall of and within said outer shell, insulating material placed between said outer and inner shells and over the bottom of the latter, and means inserted between said bottom member and said bottom in-turned flange on the outer shell for compressing said insulating material and thereby positioning the inner shell.

2. In a refrigerating device, the combination of an inner liquid container, an outside casing spaced from said container to provide an annular refrigerant space surrounding said container and enveloping it on top and at the bottom, a conduit passing from near the base of said container through said casing, a removable top fitted to said container, a conduit projecting from the top of said container to a point above the top of said outside casing, a removable top fitted to said outside casing, and having a conduit in alignment with and telescoping the upper portion of the last mentioned conduit, and a stirring mechanism projecting through said conduits into the interior of said container and having a handle which substantially fits the innermost conduit.

3. In a refrigerating device, the combination of an inner liquid container, a double walled outside casing spaced from said container to provide a refrigerant space surrounding said container, a conduit passing from near the base of said container through said double walled casing, a removable top fitted to said container and having a conduit opening therethrough into the container, a removable top fitted to said outside casing and having a conduit in alignment with the last-mentioned conduit, and stirring means extending through said conduits and operable from the outside of said casing.

4. In a refrigerating device, the combination of an inner liquid container, a double walled insulated outside casing which tapers from top to bottom providing greater insulation at the bottom portion, spaced from said container to provide a refrigerant space surrounding said container, a conduit passing from near the base of said container through said double walled casing, a removable top fitted to said container and having a conduit opening therethrough into the container, a removable top fitted to said outside casing and having a conduit in alignment with the last-mentioned conduit, and stirring means extending through said conduits and operable from the outside of said casing.

LOUIS G. KASKEY.